Aug. 19, 1958 K. A. LUNDKVIST 2,848,542

COIN BOXES

Filed Feb. 17, 1954 3 Sheets-Sheet 1

INVENTOR
KARL AXEL LUNDKVIST
BY [signature]
ATTORNEY

INVENTOR
KARL AXEL LUNDKVIST
BY Frederick E. Hane
ATTORNEY

INVENTOR
KARL AXEL LUNDKVIST
BY [signature]
ATTORNEY

United States Patent Office 2,848,542

Patented Aug. 19, 1958

2,848,542

COIN BOXES

Karl Axel Lundkvist, Stockholm, Sweden, assignor to Telefonaktiebolaget L M Ericsson, Stockholm, Sweden, a corporation of Sweden Application February 17, 1954, Serial No. 410,859

4 Claims. (Cl. 179—6.3)

This invention relates to pay stations for telephone installations, and more particularly to pay stations, which have each its own line to a telephone exchange and the coin chute which has a first coin position, in which a coin is deposited before the beginning of a communication and in which the coin is accessible so that it may be recovered, if there will be no communication. The invention relates furthermore particularly to automatic telephone exchanges with time zoning metering.

When time zone metering is introduced, there will arise an increased need for pay stations, especially if the charging is effected on the subscriber's meters and without the help of tickets furnishing details as to the communications. Subscriber's apparatus, which are available to a number of persons without supervision, must then often be replaced by pay stations. The coin container is emptied of the station by the subscriber, who is obliged to pay for all communications, according to what the subscriber's meter indicates. Thus it is important that the construction of the pay stations is simple and cheap so that the subscriber's meter will not be actuated unless a communication really takes place.

This invention has for a purpose to simplify the design of the pay stations and make possible full conformity between the number of coins paid in and the charge of the subscriber's meter. This is achieved by arranging a coin chute with a coin pawl, a deposit magnet and a coin chute contact, operated by the coins, in the pay station and by a device for sending deposit signals in the telephone exchange, containing a contact device, which is actuated at the beginning of each period of conversation, for which a coin is to be deposited, and which breaks the connection over the line, whereby a circuit is completed, which is closed by contacts in said contact device and which contains said deposit magnet, at least one talking conductor of the line and a source of current and a relay for restoring the connection in the telephone exchange, said circuit causing said coin pawl to open through the operation of the deposit magnet, whereupon the deposit of a coin, which actuates the coin chute contact, causes such a change of the circuit, that said relay is brought to restore the connection.

By the invention is furthermore achieved that prepayment and repayment can be avoided. The coin is placed in a coin position at the top of the coin chute, whereby it rests against said coin pawl and is directly accessible so that it may be taken back, if there will be no communication. The pay station thus becomes of very simple design.

The invention will be described below more in detail with reference to the accompanying drawings, Figs. 1–7.

Fig. 1 shows the equipment of the telephone exchange and Figs. 2–3 two embodiments of the pay station.

Figure 1:
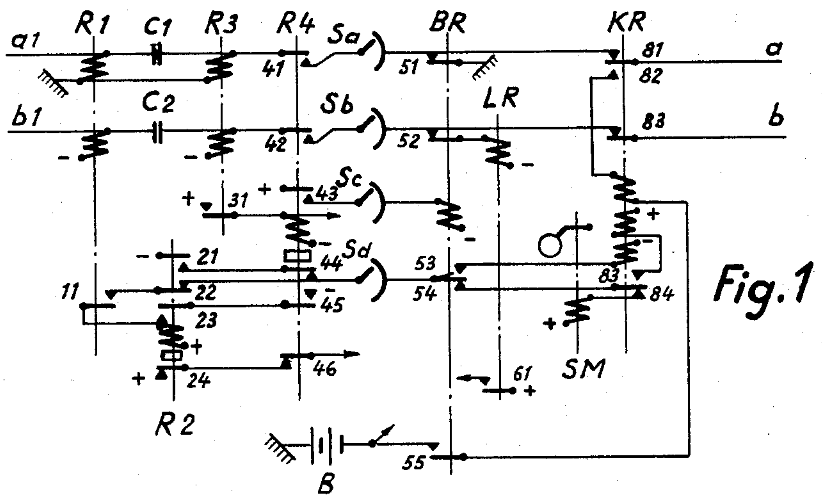
Figs. 1–3 show an embodiment of the invention with only one charge per communication.

In Fig. 1 LR and BR are the line relay and the cut-off relay of the line, SM is its subscriber's meter and KR a relay for the control of the payment. The line of the pay station is indicated with *a*, *b*, and a selector in the telephone exchange with *Sa*, *Sb*, *Sc*, *Sd*. B is an auxiliary battery and R1—R4 relays in the equipment of the selector.

Figure 2:
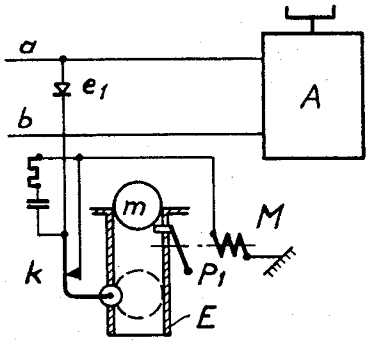
Figure 3:
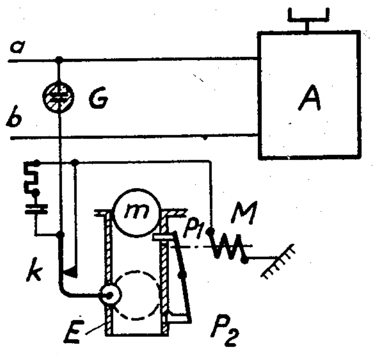

In Figs. 2 and 3, A is a standard telephone instrument. At the side of this instrument there is an additional instrument containing a coin chute E with a coin pawl P1 and a deposit magnet M and a coin chute contact *k*. In the figures there are also shown a rectifier e1, a glow discharge tube G and a coin *m*.

At calls from the apparatus A the loop over the line *a*—*b* is closed. The line relay LR attracts its armature. The contact 61 is actuated and closes a circuit, which in a known manner causes the connection of the selector *Sa*—*Sd* to the line and the operation of the relay R4, whereby the contacts 41—46 are actuated. The relay R3 is energized over the loop and the cut-off relay BR is energized over the contact 43 and the selector arm *Sc*. The contacts 51—55 and 31 are actuated. The relay R4 is slow operating and the connection is kept by the relay R3, which receives impulses from the dial of the apparatus A. The connection of dialling tone, the repeating of the impulses and setting up of a connection between the wires *a1*—*b1* and a called subscriber are not shown in the figures, because these circuits are not essential to the invention.

When an answer is obtained from the called subscriber the relay R1 is attracted and the contact 11 is actuated. The relay KR attracts in the following circuit: +, winding on the relay R2, contacts 11 and 22, selector arm *Sd*, contact 53, the lower winding of the relay KR. In the same circuit also the relay R2 also attracts, which however is slow releasing and has a longer operating time than the relay KR. The contacts 81—84 and 21—24 are actuated. The above mentioned circuit is interrupted by the contact 22, whereupon the relay R2 is kept energized over the contacts 45 and 23. The relay KR is kept energized in the following circuit: earth, auxiliary battery B, contact 55, the upper winding of the relay KR, contact 82, *a*-wire, rectifier *e1* in Fig. 2 or the glow discharge tube G in Fig. 3, coin chute contact *k*, the winding of the deposit magnet M, to earth. The magnet M withdraws the pawl P1. The contacts 81 and 83 break the connection. The relay R3 releases its armature.

If a coin drops into the coin chute E the coin chute contact *k* is actuated and the holding circuit of the relay KR is broken. The relay KR releases its armature, the connection is restored and the relay R3 attracts again before the slow operating relay R4 is able to release its armature. When the connection is disconnected after the end of the communication the relays R4, R2 and BR are released. During the release time of the slow operating relay R2 the subscriber's meter SM receives a charging impulse and is moved one step through the following circuit: +, winding on the subscriber's meter SM, contacts 84 and 54, selector arm *Sd*, contacts 44 and 21, to minus. After the relay R2 is released the selector *Sa*—*Sd* is released through a circuit over the contacts 24 and 46.

If no coin drops into the coin chute E the relays R4, R2 and BR are released. During the release time of the relay R2 the relay KR is energized in the following circuit: +, the intermediate winding of the relay KR, contacts 83 and 54, selector arm S*d*, contacts 44 and 21, to minus. When the relay R2 releases its armature, the relay KR is released. The meter SM is not actuated and the selector S*a*—S*d* is released. The calling person makes a new call by operating the line relay LR, becomes again connected to a selector S*a*—S*d* and hears the dialling tone, which in this case proves that an error has been committed.

In Fig. 3 there is another coin position, in which the coin rests against the pawl P2 and actuates the coin chute contact *k*. The pawl P2 blocks the coin chute when the pawl P1 is removed and is removed, when the pawl P1 blocks. The contact *k* is provided with a device for spark extinguishing consisting of a condenser and a resistance.

Figure 4:
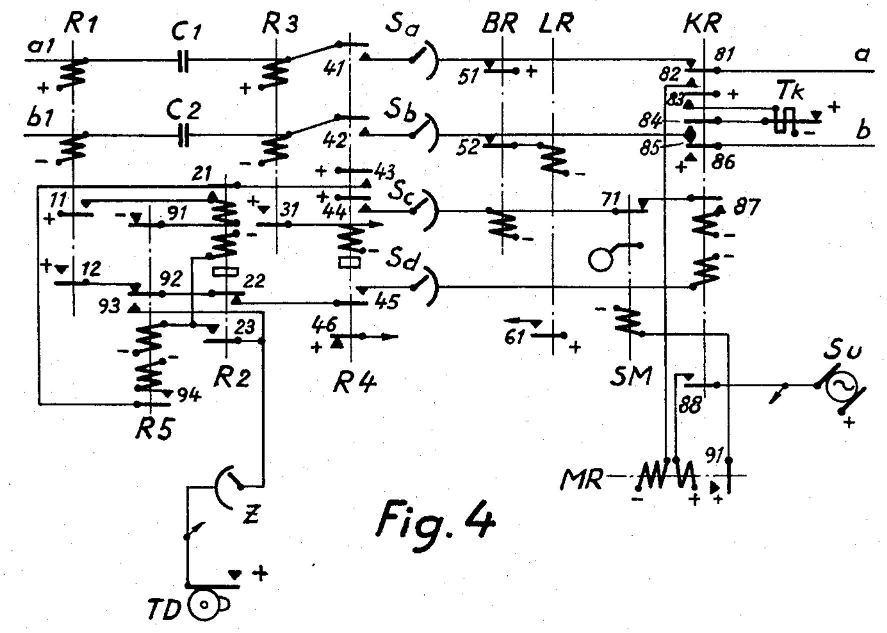
Figs. 4–5 show an embodiment with time zone metering, whereby the line of each pay station has a particular relay equipment KR—MR—SM1 in the telephone exchange.
Figure 5:
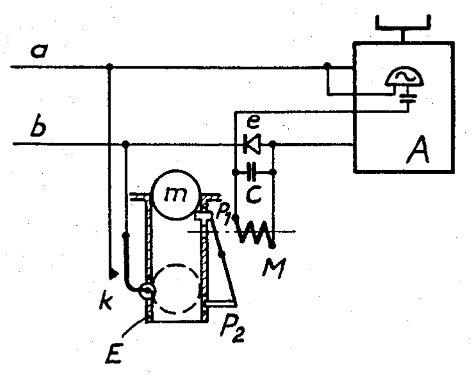

Figs. 4–5 show in the main the same details as Figs. 2–3. To that must be added a relay R5 and a selector Z for the setting of the zone tariff in the equipment of the selector S*a*—S*d*, and a relay MR and a thermocontact T*k* in the equipment of the line *a*—*b*. The deposit magnet is not connected to ground but in series with the telephone instrument A. In the telephone exchange there is an interrupter TD for zone time metering so arranged that impulses are sent to the subscriber's meter during the course of the communication. These impulses are sent with time intervals, which are determined by the toll for the communication, but they are independent of the moment of time when the communication begins. In pay stations a coin must be deposited immediately, when the called person answers. Because the next charging impulse may come at any time the first impulse arriving during the communication must be cancelled, if a repeated charging is to be used. This should be applicable also to normal subscribers and occurs in Fig. 4 by means of the relay RS.

At calls from the instrument A in Fig. 5 the line *a*—*b* is connected over the selector S*a*—S*d* to the relay R3 as is described above for Fig. 1. The current of the line passes through the rectifier *e*, which at calls and communications short-circuits the winding on the deposit magnet M. The relay R4, R3 and BR attracts. The contacts 31, 41—46 and 51—52 are actuated. When the connection has been set up, whereby also the selector Z is set and the called subscriber answers, the relay R1 is attracted. The contacts 11—12 are actuated. The relay KR is energized over the contacts 12, 92, 22 and 45 and the selector arm S*d* and attracts its armature. The contacts 81—88 are actuated. The relay R2 attracts at the same time, which relay however is slower in operation than the relay KR. The contacts 21—23 are actuated. The relay R2 is then kept energized over the contacts 43, 21 and 91 independently of the answering relay R1. The relay KR is kept energized through its upper winding over the contacts 44, 71 and 87 and the selector arm S*c*.

The contact device 81—82, 85—86 reverses the direction of the current in line *a*—*b* and the following circuit is completed: +, contact 86, *b*-wire, deposit magnet M, apparatus A, *a*-wire, contact 82, the left winding of the relay MR to minus. The deposit magnet M is not short-circuited by the rectifier *e*1 in the direction of current that now exists but attracts its armature, opens the pawl P1 and blocks the pawl P2. The magnet M has a high resistance, for which reason the relay MR does not attract in the last mentioned circuit.

If a coin *m* drops into the coin chute E, the contact *k* is actuated. The current through the winding of the relay MR is then increased and the relay MR attracts its armature. The contact 91 is actuated. The meter SM attracts its armature. The contact 71 is actuated and the relay KR releases its armature. The connection is restored, the relay MR and the subscriber's meter SM are released. Thus the meter has been advanced one step.

The deposit magnet M is short-circuited by the coin chute contact *k* as well as by the rectifier *e* after the current of direction has again been reversed, and releases its armature. The pawl P1 blocks and the pawl P2 opens so that the coin *m* drops into the coin container of the pay station.

If no coin drops into the coin chute E, the connection is maintained through the following circuit: +, thermocontact T*k*, contact 84, selector arm S*b*, contact 42, the lower winding of the relay R3, to minus. The calling person hears a buzzer sound, which is generated by the sound generator S*u* and connected by the contact 88 to the right winding of the relay MR. To have the buzzer sound heard there is a condenser C connected in parallel with the deposit magnet M of the coin box. The thermocontact T*k* is energized over the contact 83, which is heated after about 10 seconds and then breaks the circuit of the relay R3. The relays R3, R4 and R5 are released and the selectors Z and S*a*—S*d* are released by a circuit over the contact 46. The relays BR and KR release without the subscriber's meter SM being actuated.

During the time interval, which is caused by the thermocontact T*k*, the calling person can let a coin drop into the coin chute E, whereby the relay MR and the subscriber's meter SM1 attract and the relay KR is released and restores the connection.

If a communication takes place impulses will arrive from the interrupter TD with even intervals during the course of the communication.

The first impulse from the interrupter TD causes the operation of the relay R5. The contacts 91—94 are actuated. The relay R5 is then kept energized through its lower winding over the contacts 43 and 94. The contact 91 breaks the current of the relay R2, which however, due to its lower winding, does not release its armature until the impulse from the interrupter TD is finished. The contacts 21 and 23 open and the contact 22 is actuated.

At each successive impulse from the interrupter TD the relay KR is operated in the following circuit: +, interrupter TD, selector Z, contacts 93, 22 and 45, selector arm S*d*, the lower winding of the relay KR, to minus. If a new coin is dropped into the coin chute E, the connection is immediately restored and the subscriber's meter SM is advanced one step as described above, whereafter the communication may continue a further period of conversation. If no coin is paid, the connection is interrupted.

Figure 6:
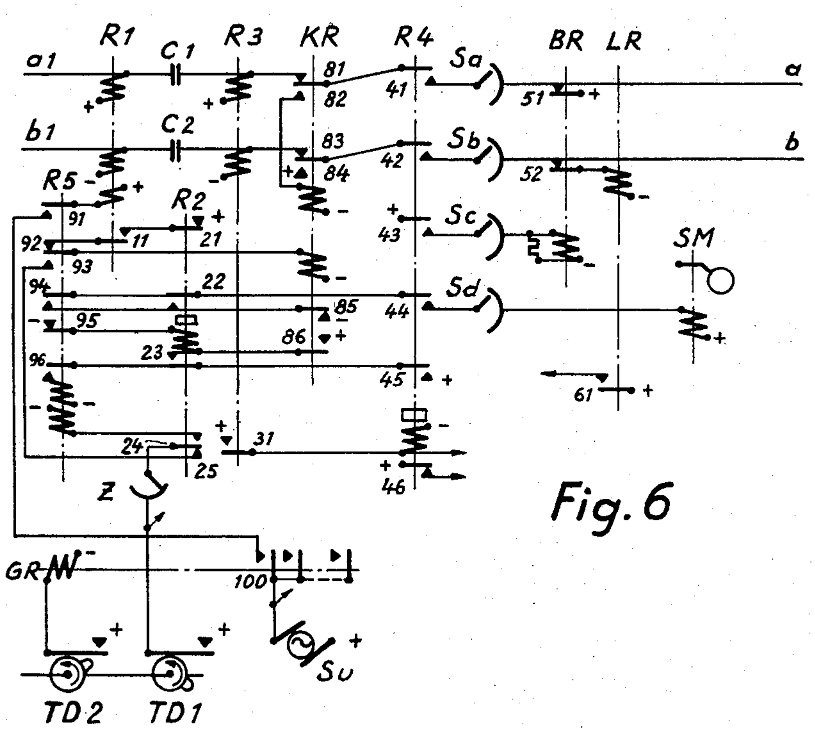
Figs. 6–7 show another embodiment with time zone metering, at which the pay station is connected to a normal subscriber's line and the devices necessary for charging the meter are to be found in the relay set of a selector, which at calls from the pay station is connected to the line of the coin box.
Figure 7:
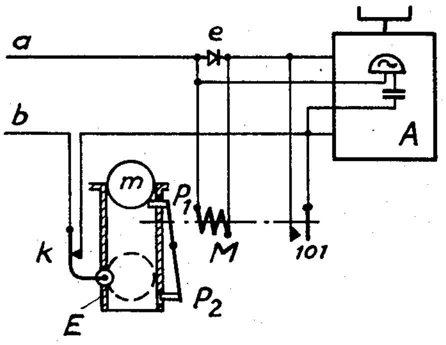

Figs. 6–7 show an embodiment of the invention, which is adapted in those cases when a large number of pay stations are used together with common subscriber's apparatus in a telephone plant with zone time metering.

In Fig. 6 LR, BR and SM are the line relay, the cutoff relay and the subscriber's meter of a normal subscriber's line. At calls from the telephone instrument A in Fig. 7 the line *a*—*b* is connected in a known manner to a relay set R1—R5, KR over a selector S*a*—S*d*. The relays R3, R4 and BR attract their armatures. The contacts 31, 41—46 and 51—52 are actuated. The calling person hears the dialling tone, emits impulse series with his dial and is connected to another subscriber, which is connected to the wires $a_1$—$b_1$. At the same time the selector Z is set in accordance to the tariff for the communication. The circuits of these processes are not shown in the figure, because they are not essential to the invention. During the call and later also during the communication the direction of current of the line *a*—*b* is such that the rectifier *e* in Fig. 7 keeps the deposit magnet M short-circuited.

When the called subscriber answers, the relay R1 is attracted. The contact 11 is actuated. The relay KR attracts its armature in a circuit over the contacts 21, 11 and 92, actuates the contacts 81—86 and is then kept energized in the following circuit: +, contacts 84 and 42, selector arm $Sb$, $b$-wire, coin chute contact $k$, apparatus A, deposit magnet M, $a$-wire, selector arm $Sa$, contacts 41 and 82, the upper winding of the relay KR, to minus. The deposit magnet M opens the pawl P1 and blocks the pawl P2 and closes the contact 101. The contact device 81—82 and 83—84 breaks the connection, whereby the relay K3 releases its armature. During the release time of the slow operating relay R4 the payment of a coin must be controlled.

If a coin $m$ drops into the coin chute E in Fig. 7, it stops at the pawl P2 and actuates the coin chute contact $k$, which breaks the holding circuit of the relay KR. The relay KR releases its armature and the connection is restored. The relay R3 attracts again and closes the contact 31 so that the relay R4 is energized. During the process the telephone instrument A is kept short-circuited by the contact 101 so that a break in the cradle contact of the apparatus does not cause that the relay KR releases.

If no coin drops into the coin chute, when the pawl P1 is opened, the relay R4 releases and the selector $Sa$—$Sd$ is released by a circuit over the contact 46, said circuit being not shown. The relay BR releases, the relay LR attracts, the deposit magnet M releases and the calling person causes a new call, whereby the dialling tone returns and indicates that a mistake has been committed.

If a communication takes place, the relay R2 will attract its armature when the contact 86 is actuated, and then be kept energized in a circuit over the contacts 45, 23 and 95. The relay R2 is slow releasing but quick in operation. The contacts 21—25 are actuated.

The first impulse from the interrupter TD1 energizes the relay R5, which attracts its armature and actuates the contacts 91—96. Then the relay R5 is kept energized by its upper winding over the contacts 96 and 45. The contact 95 breaks the current of the relay R2, which however, because it is slow releasing, does not release until the impulse from the interrupter TD is finished. Then the contacts 21—25 are restored. Immediately before, for instance 20 seconds before, each impulse from the interrupter TD1, an impulse is sent from the interrupter TD2 to the relay GR, which closes a contact 100 for each relay equipment R1—R5, KR in the telephone exchange. Over the contact 100 there is connected a buzzer generator $Su$ to a winding on the relay R5 via the contact 91, whereby the parties are put on notice that the period is soon ended and that a new toll must be paid if the communication is to be continued.

The second and subsequent impulses from the interrupter TD1 operate the relay KR in a circuit over the selector Z and the contacts 25 and 93. The contacts 81—86 are actuated and the cycle mentioned above is repeated depending upon whether a coin $m$ is deposited or not.

I claim:

1. In an automatic telephone system, a telephone exchange, a pay telephone station, a line connecting said pay station with said exchange, said pay station including a coin chute, a contact means within said chute actuated by a coin passing through the chute, a movable blocking nose mounted and biased to extend into said chute to block the passage of a coin therethrough and electromagnetic means for controlling the passage of a coin through the chute coacting with said nose to withdraw the nose from the chute upon energization of said electromagnetic means; said exchange including a subscriber's meter for said pay station, relay means; relay contact means controlling the connection between said line and said exchange; means actuating said relay contact means at the beginning of each period of time for which a coin is to be deposited; an energizing circuit including said electromagnetic means, said line and said relay means; the actuation of said relay contact means disconnecting said connection and closing said energizing circuit, the resulting energization of said electromagnetic means causing withdrawal of said nose to free a coin inserted in said chute for passage therethrough to effect actuation of the chute contact means, the actuation of said chute contact means controlling said energizing circuit so as to operate said relay means included therein for restoring the connection between said line and said exchange, and an energizing circuit for said meter controlled by said relay means, said energising circuit for the meter being closed upon operation of said relay means by said chute contact means.

2. An automatic telephone system, a telephone exchange and a pay telephone station according to claim 1, wherein said blocking nose in its blocking position retains a coin inserted in said chute in a first position in which the coin is recoverable by a user of the pay station if no connection is established and said chute contact means is positioned to be actuated by a coin having passed said nose and reached a second position in which the coin is inaccessible to the user of the pay station, and further comprising a second movable blocking nose extending into the chute and actuated by said electromagnetic means, said second nose being moved into a blocking position upon energization of the electromagnetic means and withdrawn upon deenergization of the electromagnetic means to block the chute when said first nose is in its withdrawn position; rectifying means included in a circuit with said electromagnetic means, said rectifying means short-circuiting the electromagnetic means in response to a current flow through said line in one direction, said energizing circuit, which includes said electromagnetic means, said line and said relay means being connected to reverse, when closed, the current flow through the line thereby operating said electromagnetic means and said chute contact means short-circuiting said line in response to a coin being in said second position, and said relay means being actuated in response to said short-circuit of the line and closing the energizing circuit for said meter.

3. In an automatic telephone system, a telephone exchange, a pay telephone station, a line connecting said pay station with said exchange, said pay station including a coin chute, a contact means within said chute actuated by a coin passing through the chute, a movable blocking nose mounted and biased to extend into said chute to block the passage of a coin therethrough and electromagnetic means for controlling the passage of a coin through the chute coacting with said nose to withdraw the nose from the chute upon energization of said electromagnetic means; said exchange including a subscriber's meter for said pay station, a relay, contact means controlled by said relay and controlling the connection between said line and said exchange, means actuating said relay at the beginning of each period of time for which a coin is to be deposited, holding coil means on said relay; an energizing circuit including said electromagnetic means, said line and said holding coin means; the actuation of said relay disconnecting said line connection and closing said energising circuit, the resulting energization of said electromagnetic means causing withdrawal of said nose to free a coin inserted in said chute for passage therethrough to effect actuation of the chute contact means, the actuation of said chute contact means controlling said energizing circuit so as to break said energising circuit and to release said relay for restoring the connection between said line and said exchange, and an energizing circuit for said meter controlled by said relay, said energizing circuit for the meter being closed upon the release of said relay.

4. In an automatic telephone system, a telephone exchange and a pay telephone station according to claim 3, wherein said blocking nose in its blocking position retains a coin inserted in said chute in a first position in which the coin is recoverable by a user of the pay station if no connection is established and said chute contact means is positioned to be actuated by a coin having passed said nose and reached a second position in which the coin is inaccessible to the user of the pay station, and further comprising a second movable blocking nose extending into the chute and actuated by said electromagnetic means, said second nose being moved into a blocking position upon energization of the electromagnetic means and withdrawn upon deenergization of the electromagnetic means to block the chute when said first nose is in its withdrawn position, rectifying means included in a circuit with said electromagnetic means, said rectifying means shortcircuiting the electromagnetic means in response to a current flow through said line in one direction, said energizing circuit which includes said electromagnetic means, said line and said holding coil means, being connected to reverse, when closed, the current flow through the line for operating said electromagnetic means and said chute contact means to break said energizing circuit in response to a coin being in said second position, whereby said relay is released and closes the energizing circuit for said meter.

References Cited in the file of this patent

UNITED STATES PATENTS

| | | |
|---|---|---|
| 2,082,561 | Appelius | June 1, 1937 |
| 2,087,903 | Dohle | July 27, 1937 |
| 2,134,168 | Wright | Oct. 25, 1938 |
| 2,251,301 | Sobotta | Aug. 5, 1941 |
| 2,623,950 | Ungar | Dec. 30, 1952 |